(12) United States Patent
Randall et al.

(10) Patent No.: US 7,870,506 B2
(45) Date of Patent: Jan. 11, 2011

(54) AUDIT TRAIL MANAGEMENT FOR A MENU SYSTEM IN A DIGITAL CONSUMER PRODUCT

(75) Inventors: Darrel Wayne Randall, Danville, IN (US); Wanda Green Thompson, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 599 days.

(21) Appl. No.: 11/596,496

(22) PCT Filed: Apr. 29, 2005

(86) PCT No.: PCT/US2005/015002

§ 371 (c)(1),
(2), (4) Date: Nov. 13, 2006

(87) PCT Pub. No.: WO2005/115002

PCT Pub. Date: Dec. 1, 2005

(65) Prior Publication Data

US 2007/0244931 A1    Oct. 18, 2007

Related U.S. Application Data

(60) Provisional application No. 60/571,336, filed on May 14, 2004.

(51) Int. Cl.
*G06F 3/048* (2006.01)
(52) U.S. Cl. ...................................... 715/811
(58) Field of Classification Search ............ 715/811
See application file for complete search history.

(56) References Cited

U.S. PATENT DOCUMENTS

| | | | |
|---|---|---|---|
| 5,918,222 A * | 6/1999 | Fukui et al. | 707/1 |
| 6,553,309 B2 | 4/2003 | Uchida | |
| 6,557,015 B1 * | 4/2003 | Bates et al. | 715/229 |
| 6,590,584 B1 * | 7/2003 | Yamaura et al. | 715/704 |

(Continued)

FOREIGN PATENT DOCUMENTS

| AU | 753743 B2 | 10/2002 |
|---|---|---|
| WO | WO0143424 A | 6/2001 |

OTHER PUBLICATIONS

Supplementary European Search Report dated Apr. 16, 2009.

*Primary Examiner*—Dennis-Doon Chow
*Assistant Examiner*—Le Nguyen
(74) *Attorney, Agent, or Firm*—Robert D. Shedd; Joseph J. Opalach; Reitseng Lin (57) ABSTRACT

A digital consumer product having a menu system includes an audit trail system having an audit trail management system that removes screens from an audit trail triggered by the addition of a new screen to the audit trail. Menu screens and/or video screens are added to the audit trail as navigated by the user and, accordingly, certain screens are removed from the audit trail. The audit trail management system also provides the ability to store two or more instances of full-screen video and all intervening screens, the ability to provide all data and temporary state information for all screens stored in the audit trail and the ability to restore and refresh them, the ability to retain partial screens and screen objects and the ability to restore and refresh them, and the ability to remove any or all stored screens.

35 Claims, 5 Drawing Sheets

U.S. PATENT DOCUMENTS 6,667,751 B1 * 12/2003 Wynn et al. ................. 715/833
7,334,190 B2 * 2/2008 Wierowski .................. 715/712
2002/0191015 A1 * 12/2002 Brown et al. ................ 345/738
2005/0076309 A1 * 4/2005 Goldsmith .................. 715/811
2005/0125743 A1 * 6/2005 Beaton et al. ............... 715/811
2005/0235319 A1 10/2005 Carpenter

* cited by examiner

AUDIT TRAIL MANAGEMENT FOR A MENU SYSTEM IN A DIGITAL CONSUMER PRODUCT

This application claims the benefit, under 35 U.S.C. 365 of International Application PCT/US2005/015002, filed Apr. 29, 2005 which was published in accordance with PCT Article 21(2) on Dec. 1, 2005 in English and which claims the benefit of U.S. provisional patent application No. 60/571,336 filed May 14, 2004.

CROSS-REFERENCE TO RELATED APPLICATIONS

This U.S. non-provisional patent application claims the benefit of and/or priority to U.S. provisional patent application Ser. No. 60/571,336 filed May 14, 2004, the entire contents of which is specifically incorporated herein by reference.

FIELD OF THE INVENTION

The invention relates generally to digital consumer products and, in particular, to audit trail management for a menu system in a digital consumer product.

BACKGROUND OF THE INVENTION

For some digital consumer products it is desirable to retain information about a path taken by the user through the menu system to allow such user to traverse backwards along that path. It is also desirable to allow multiple instances of full-scale video to be present in the audit trail. However, current menu systems are designed so that a simple recording of the path results in indeterminately long audit trails, since the menu system allows the user to "loop" within the menu system (that is, to invoke screen B from screen A, and then invoke screen A from screen B, allowing many other screens in between).

Many digital consumer products that implement an audit trail have an abundance of memory and very little information about the nature of the screens being viewed. Some of these products have implemented a simple audit trail management scheme that allows only a single instance of each screen (including full-screen video) with simple truncation of the audit trail. For example, such systems typically clear the audit trail when returning to full-screen video or when creating a new screen that is already in the audit trail, and truncate the audit trail by replacing the previous instance of the screen and everything added after it, thus essentially replacing the previous instance of the screen with a new instance. Clearly, there are problems associated with current audit trail management schemes.

It is evident from the above that there is a need for effective and/or efficient audit trail management for menu systems in digital consumer products.

SUMMARY OF THE INVENTION

In one form of the invention, there is provided an audit trail management scheme for a digital consumer product. Particularly, there is provided a method for adding a next screen to an audit trail in an electronic device providing menu screens and video screens. The method comprises the steps of: (a) if the next screen is a video screen and a predetermined number of video screens has been saved in the audit trail, removing one of the predetermined number of video screens before adding the next screen to the audit trail; and (b) if the next screen is not a video screen and an existing instance of the next screen is in the audit trail, removing the existing instance and all screens added thereafter before adding the next screen to the audit trail.

Preferably, the one of the predetermined number of video screens is the earliest (least recent) instance of the predetermined number of video screens, and all screens between the earliest instance and the immediately next instance of video screen are also removed.

In another form of the invention, there is provided a digital television apparatus providing menu screens and video screens and configured to implement an audit trail management scheme as provided herein. The digital television apparatus includes storage device for storing an audit trail comprising one or more menu screens and video screens, and a controller coupled to the memory device and adapted to add a next screen to the audit trail. The controller is operable such that: (a) if a predetermined number of video screens has been saved in the audit trail before adding a next screen to the audit trail, the controller removes one of the predetermined number of video screens, and (b) if the next screen is not a video screen and an existing instance of the next screen is already in the audit trail, the controller removes the existing instance and all screens added thereafter before adding the next screen to the audit trail.

Preferably, if the predetermined number of video screens has been saved in the audit trail, the controller further removes any screens added before the one of the predetermined number of video screens, and the one of the predetermined number of video screens is the instance of the predetermined number of video screens first added to the audit trail.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the invention, the drawings are not necessarily to scale and certain features may be exaggerated in order to better illustrate and explain the invention. The exemplifications set out herein illustrate embodiments of the invention, but such exemplifications are not to be construed as limiting the scope of the invention in any manner.

DETAILED DESCRIPTION

The embodiment disclosed herein is not intended to be exhaustive or limit the invention to the precise form disclosed so that others skilled in the art may utilize its teaching.

Figure 1:
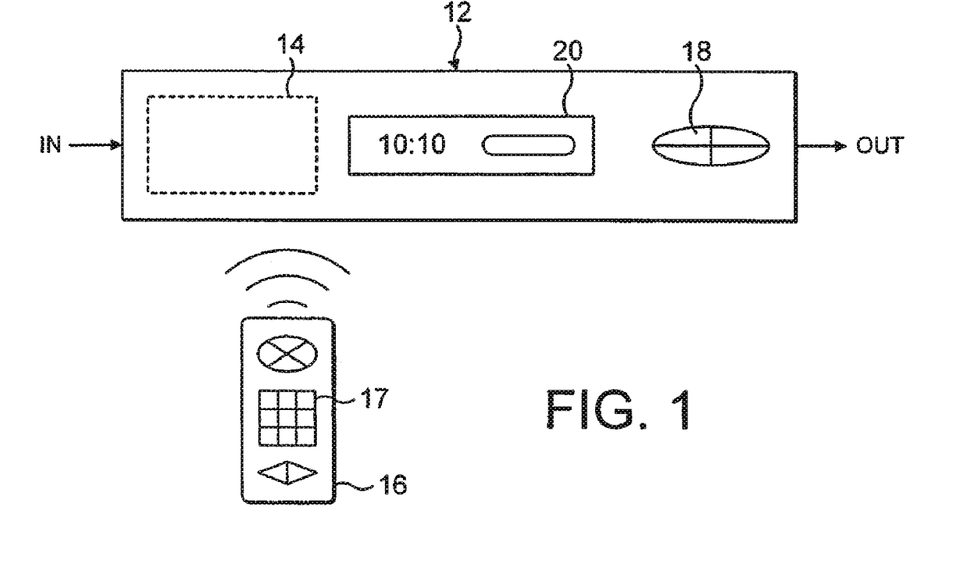
FIG. 1 depicts an exemplary digital television apparatus incorporating the present invention.

Referring to FIG. 1, there is depicted a digital television apparatus in the form of a digital set top box, generally designated 12, that embodies the present invention. It should be appreciated that the digital set top box (set top box or STB) 12 is representative of a set top box, television signal receiver, television, cable box/receiver, satellite receiver/DBS, DVR and/or the like including digital consumer products combining and/or integrating the aforementioned and/or other functionality and, or course, the present invention. As such, the present invention may be considered as embodied in a digital consumer product.

Set top box 12 includes a controller or control means (collectively, 'controller') 14 for operation of set top box 12 such as is known in the art and, as such, includes the necessary hardware, programming, data, memory and/or the like to carry out the operation, features and/or functions of a set top box. Moreover, controller 14 includes the necessary hardware, programming, data, memory and/or the like to carry out the operation, features and/or functions of the present invention. Particularly, controller 14 is operative to implement audit trail management in accordance with the principles of the present invention as provided herein.

Set top box 12 also includes an audio/video (e.g. television signal) input (IN) for receiving audio/video signals such as television signals, and an audio/video (e.g. television signal) output (OUT) for outputting audio/video signals such as television signals for output to a display. External controls 18 are typically provided that allow for direct user input to the set top box 12. A screen 20 may also be provided that can indicate, without being limiting, time (i.e. clock), current channel number, and/or function indicia.

A remote 16 is depicted in FIG. 1 that may be used to control and/or provide input signals to set top box 12. As such, a remote signal receiver and processing are included in and/or associated with controller 14. Remote 16 has input keys, buttons, selection areas or the like 17 for accepting user input, processing necessary to accept the user input, and hardware such as IR transmitters to provide input signals. Inputs 17 may be dedicated, variable, single-purpose, multi-purpose, user programmable, learning or the like, and/or combinations of same, all of which provides input for channel selection, menu selection, response to menu queries, programming input, set-up and/or the like. As such, the set top box 12 includes the necessary input signal receiving hardware and processing to accept, process and act upon the received input signals.

Figure 2:
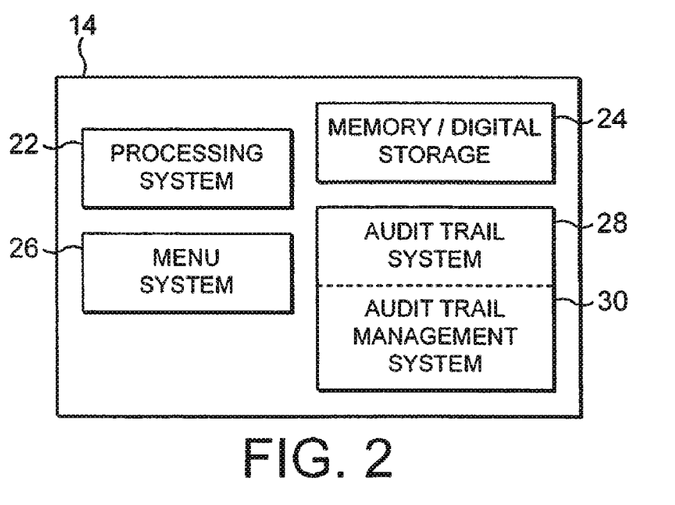
FIG. 2 is a block diagram of components of the digital television apparatus of FIG. 1.

In FIG. 2, there is depicted a block diagram representation of at least some of the components, features and/or functions, without being limiting, of controller 14. Controller 14 includes and/or is associated with processing system 22 that is operative to provide all the necessary processing of video, audio, data separately and/or in conjunction with the other systems of controller 14 for reception and distribution of television signals. Memory and/or digital storage 24 is also associated with the controller 14. In one instance, memory/digital storage 24 stores the program instructions and data necessary for operation of controller 14.

Controller 14 also includes and/or is associated with menu system 26 that is operative to provide a typical menu system including program guide, program information, set up, programming and/or the like. For instance, menu system 26 provides for display of one or more menus (including, but not limited to, system set-up, program guide and/or program guide data) in response to user input. Menu system 26 allows navigation through various menu screens of the digital consumer product for various purposes. Menu system 26 also allows for video selection and thus the showing of video, both full-screen video and inset video. Additionally, controller 14 includes and/or is associated with an audit trail system 28 that includes audit trail management system 30. Audit trail system 28 is operative to maintain an audit trail of screens traversed by the user such as during a menu session. Particularly, audit trail system 28 saves a series, such as a consecutive series, of screens provided for display by set top box 14 (or, displayed depending on the type of digital consumer device) during user input. Thus, as the user navigates from one screen to another, each screen is saved in the audit trail. Screens may be menu screens, full-screen video or otherwise.

Figure 3:
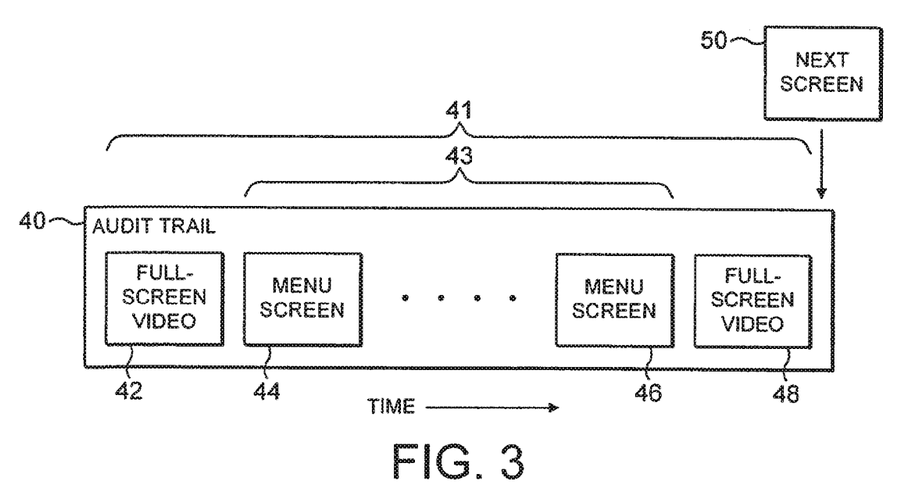
FIG. 3 is a representation of an exemplary audit trail.

In FIG. 3, there is depicted a representation of an exemplary audit trail, generally designated 40, that has been saved by the audit trail system 28. The audit trail 40 is shown having a plurality of screens 41. Of the plurality of screens 41, some are full-screen video screens 42 and 48, with some intervening screens 43, the intervening screens shown as menu screens 44 and 46. The menu screens 44 and 46 represent one to a plurality of screens that may be stored by audit trail 40 between two instances of full-screen video (i.e. non-menu screens). In accordance with the principles of the present invention, audit trail system 28 provides that audit trail 40 is able to store two or more instances of full-screen video, i.e. screens 42 and 48, and all intervening menu screens 43. The set of a full-screen video screen and all menu screens between this full-screen video screen and the immediate next full-screen video screen is called a sub-trail.

As the user navigates through various menu screens and full-screen video, next screens 50 are added to the audit trail 40. Next screens 50 may be menu screens or full-screen video. In order that the audit trail 40 does not become too large, the present audit trail management system 30 provides a manner of pruning or removing screens from the audit trail. Such pruning may be, and preferably is, triggered by the addition of a new screen.

As an example, assume that a user is watching a full-screen video with a channel banner with current program information displayed over part of the screen. When the user presses a menu key on the remote 16, the channel banner with current program information and other objects associated with the full-screen video are added to the audit trail as an instance of full-screen video.

According to one aspect of the present pruning scheme, when entering a menu system of controller 14, leaving full-screen video, and there are already a predetermined or set number of instances of full-screen video in the current audit trail, the audit trail is truncated by removing an earlier instance of the predetermined number of instances of full-screen video, preferably the earliest (least recent) instance of the predetermined number of instances. Preferably, all the screens between the instance of full-screen video to be removed and the immediate next instance of full-screen video are also removed, thus removing the associated sub-trail. According to another aspect of the present pruning scheme, when creating a new menu screen that is already in the audit trail, and the existing instance is added after the last (most recent or latest) instance of full-screen video, the audit trail is truncated by removing the existing instance of the screen and everything added thereafter.

According to a further aspect of the present invention, the pruning scheme may further impose a limit, if necessary, allowing only one instance of each different menu screen in an audit trail. In this scenario, if an instance of a new menu screen to be added already exists in the audit trail and was added before the last instance of the predetermined number of instances of full-screen video, the audit trail is truncated to remove any screens added before the instance of full-screen video immediately following the existing instance. As an alternative, the audit trail is truncated to remove the instance of full-screen video immediately added before the existing instance and any screen added thereafter. Another alternative is that the audit trail is truncated to remove the existing instance and all screens added thereafter.

In a particular implementation of the present pruning algorithm to remove screens from the audit trail (triggered by the addition of a, or to be added, new screen to the audit trail) when entering the menu system (i.e. leaving full-screen video) and there are already two instances of video in the current audit trail, the audit trail management system 30 truncates the audit trail 40 by removing everything added before the last (i.e. most recent) instance of video. When a new screen (other than full-screen video) is to be added to the audit trail 40, and the new screen is already in the audit trail, and the existing instance of that screen is added before the last instance of video (full-screen video), the audit trail management system 30 truncates the audit trail 40 by removing everything added before the last instance of video. When a new screen is to be added that is already in the audit trail 40, and the existing instance of that screen is added after the last instance of video, the audit trail management system 30 truncates the audit trail 40 by removing the previous instance of the screen and everything added after it. This essentially replaces the previous instance of the screen with a new instance.

The audit trail system 28 also allows the user to navigate through the various screens of the audit trail 40. Particularly, the audit trail system 28 is operative to allow backward and forward navigation through the audit trail 40. In this manner, the user is able to view the path taken.

Figure 4:
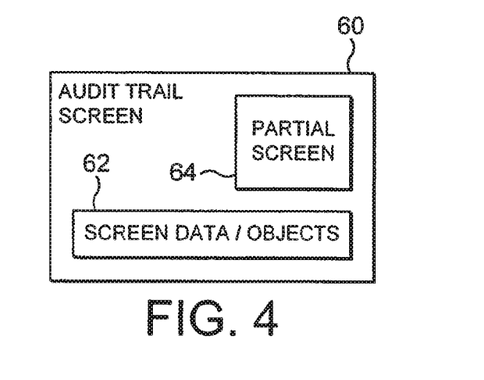
FIG. 4 is a representation of an exemplary audit trail screen.

A screen typically includes more information or data than just video data such as that related to the display of the screen. Particularly, a screen may have associated data and temporary state information. The present audit trail management system 30 is able to provide all the data and temporary state information for all screens that are stored in (part of) the audit trail 40 and to restore them when traversing the trail backwards. Referring to FIG. 4, there is depicted an exemplary audit trail screen 60 that has been stored in the audit trail 40. The audit trail screen 60 includes screen data and/or objects 62. Additionally, the audit trail screen 60 has a partial screen 64 such as a pop-up menu or the like. The present audit trail management system 30 is operative to retain any such partial screens that were showing when the screen was stored. Moreover, the present audit trail management system 30 is operative to provide notification to the system that screens and screen objects have been restored such that the screens and screen objects may update any stale data. Furthermore, the present audit trail management system 30 provides the ability to remove any or all stored screens from memory, and provide a mechanism by which screens and screen objects may be notified that they are about to be deleted in order to restore any system states, for example, that have been changed and to free any locally allocated memory.

Figure 5:
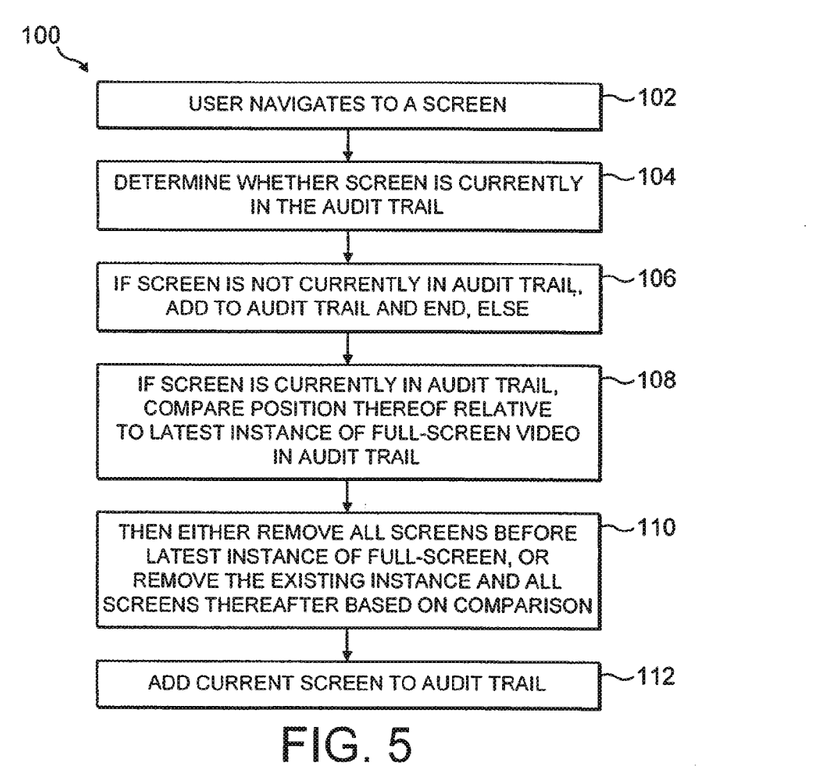
FIG. 5 is a flow chart of an exemplary manner of removing one or more menu and/or video screens in an audit trail.

FIG. 5 provides a flowchart, generally designated 100, of a manner of removing or pruning screens from the audit trail in accordance with the principles of the subject invention. In this example, assume that the new screen to be added is a menu screen and the maximum number of instances of full-screen video allowed is two. In one form, the method 100 removes or prunes screens from the audit trail when a new screen is added to the audit trail. In another form, the method 100 removes or prunes screens from the audit trail when a next screen to be added to the audit trail is already in the audit trail (i.e. a first instance). The particular screens pruned or removed depend on the position of the first instance relative to a full-screen video screen of the audit trail. Particularly, certain screens are removed from the audit trail upon the addition of a new screen, the certain screens based on the type of new screen, whether it is currently in the audit trail, and its position relative to one or more screens of the audit trail.

In initiating the audit trail scheme, in step 102, the user navigates to a screen. In step 104, it is determined whether the current screen is currently (already) in the audit trail. In step 106, if the current screen is not currently in the audit trail, the current screen is added to the audit trail, and no pruning or removing of screens takes place. If the current screen is in the audit trail, step 108, the position of the last instance of the current screen in the audit trail is compared to a latest or last instance of full-screen video in the audit trail. In step 110, either all screens added before the latest instance of full-screen video are removed in response to the step 108 comparison, or the existing instance of the new screen and all screens added thereafter are removed in response to step 108. Lastly, in step 112, the current screen is then added to the audit trail.

Figure 6:
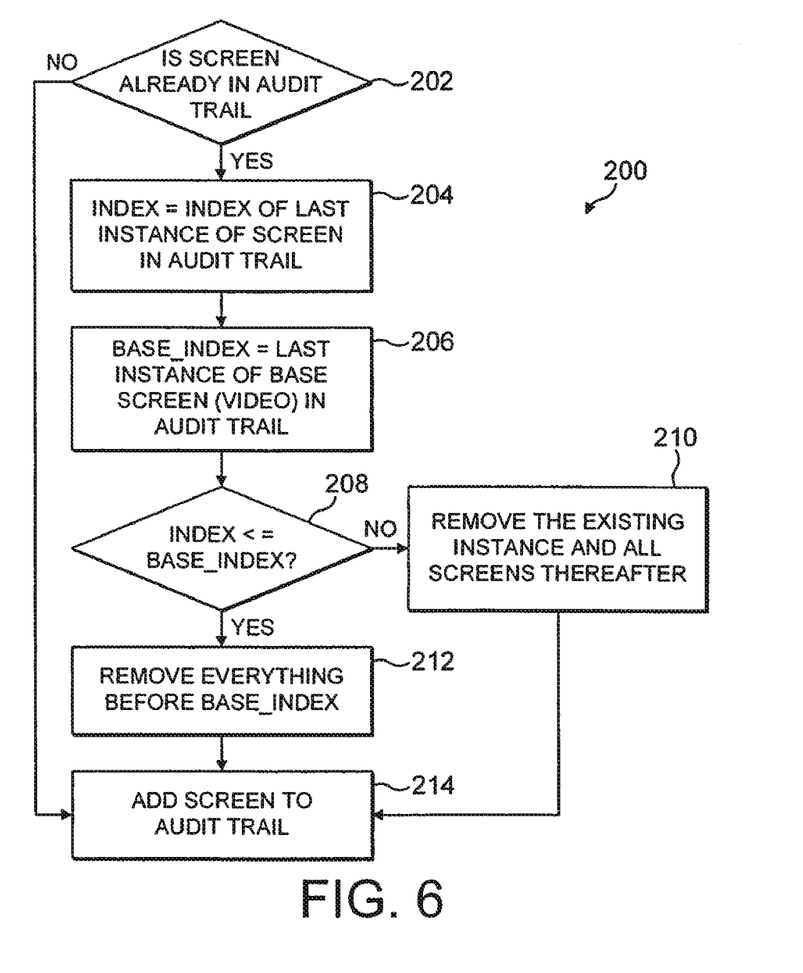
FIG. 6 is a pseudo-code flow chart of an exemplary manner of implementing a pruning scheme for removing one or more menu and/or video screens in an audit trail that limits the number of instances of full-screen video to two.

Referring now to FIG. 6, there is shown a flowchart showing a pseudo-code manner 200 of providing the present pruning scheme or system for screens currently in the audit trail. Again assume that the new screen to be added is a menu screen and the maximum number of instances of full-screen video allowed is two. The pruning scheme 200 is triggered by navigation to or addition of a screen in the audit trail. In step 202, the audit trail management system 30 determines whether the screen either to be added or added (i.e. navigated to by the user) is already in the audit trail. If the audit trail management system 30 determines that the screen is not already in the audit trail (i.e. "no") then, in step 214, the screen is added to the audit trail. In step 202, if the audit trail management system 30 determines that the screen is already in the audit trail (i.e. "yes"), then, in step 204, an index (position) is provided for the screen that equates to an index (position) of the last instance of the screen in the audit trail. Then, in step 206 a base index (position) is provided for a last instance of base screen (full-screen video) in the audit trail. Thereafter, in step 208, the index is compared to the base-index. Particularly, in step 208 it is determined whether the index is less than or equal to the base index.

If the index is not less than or equal to the base index (i.e. "no"), then in step 210, the existing instance of screen and all screens added after the existing instance pointed by the index are removed. Thereafter, in step 214, the screen is added to the audit trail. If the index is less than or equal to the base index (i.e. "yes"), then in step 212 all screens added before the base index (base index screen) is removed from the audit trail. Alternatively, if the index is less than or equal to the base index, the existing instance and all screens added thereafter are removed. Thereafter, in step 214, the screen is added to the audit trail.

Figure 7:
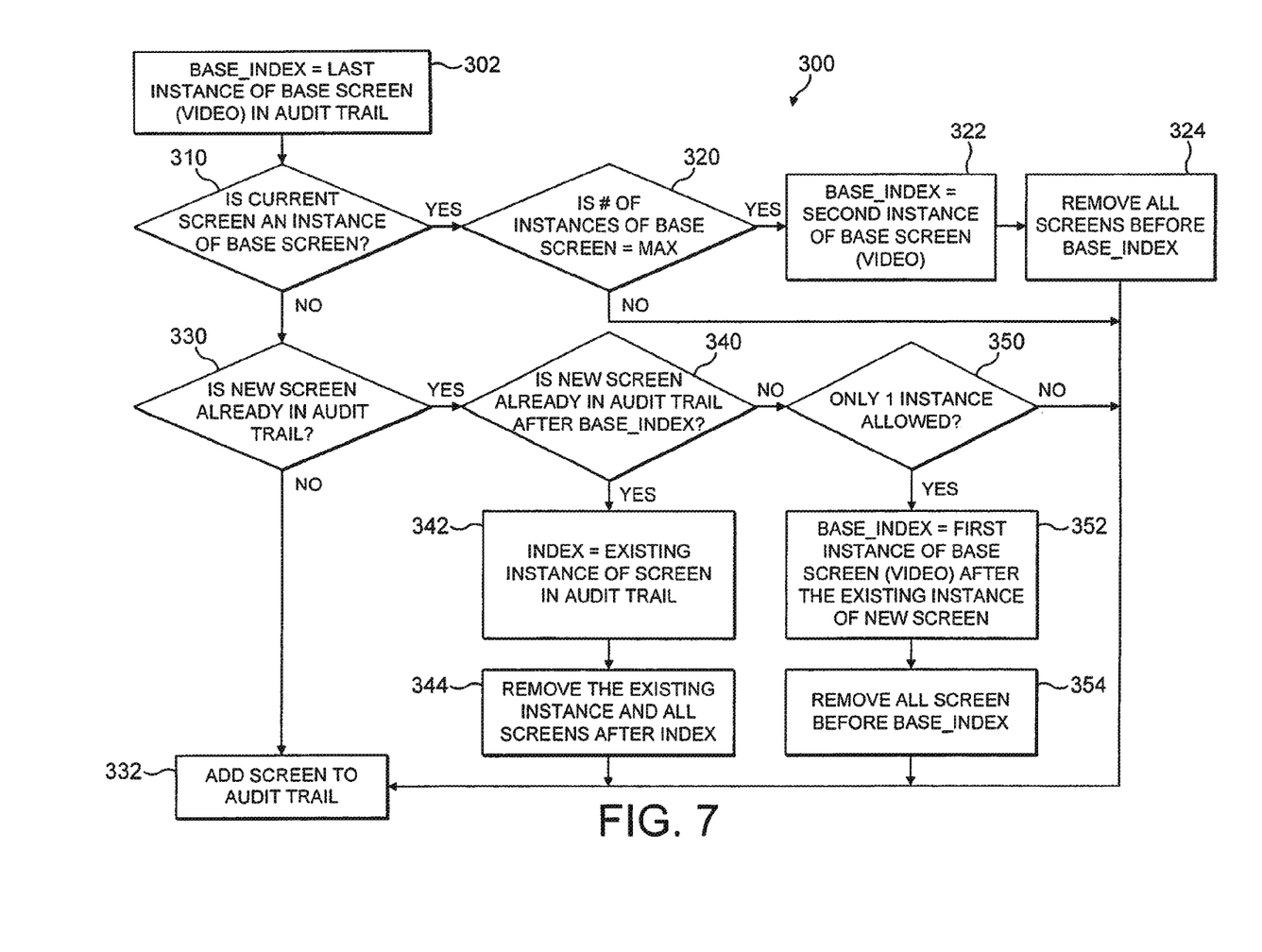
FIG. 7 is a pseudo-code flow chart of an exemplary manner of implementing a pruning scheme for removing one or more menu and/or video screens in an audit trail that limits the number of instances of full-screen video to two or more.

FIG. 7 illustrates an exemplary process 300 for adding a menu screen or a full-screen video to an audit trail according to the principles of the invention, where two or more instances of full-screen video are allowed in the audit trail. A variable, base_index, is assigned to point to the position of the last instance of base screen (full-screen video) at step 302. At step 310, a determination is made to determine whether a current screen to be added to the audit trail is an instance of base screen. If the answer is positive, the process determines whether the number of instances of base screen in the audit trail has reached a predetermined number at step 320. If the number has not reached the predetermined number, the process proceeds to add the current screen to the audit trail at step 332.

If the number of instances has reached the predetermined number as determined at the decision step 320, the base_index is reassigned to point to the second instance (the instance immediately after the earliest instance) of base screen at step 322, and all the screens added before the second instance of the base screen are removed at step 324 before the new screen is added at step 332. As indicated earlier, instead of removing the earliest (first) instance of base screen, the process can remove any earlier instance of base screen and the associated menu screens in the corresponding sub-trail to make room for the new base screen.

If the answer at the decision step 310 is negative, the process proceeds to a decision block 330 for checking whether an instance of the new screen is already in the trail. If there is no instance of the new screen in the audit trail, the process proceeds to add the new screen to the audit trail at step 332.

If the result from the decision step 330 is positive, the process proceeds to determine whether the existing instance is added after the last instance of base screen pointed by the base_index at a decision step 340. If the existing instance is determined to be added after the last instance of base screen at the decision step 340, the process proceeds to step 342 where the index is reassigned to point to the position of the existing instance at step 342, and the existing instance and all screens added thereafter are removed at step 344 before the new screen is added to the audit trail at step 332.

If the result for the decision step 340 is negative, i.e., the existing screen is not added after the last instance of base screen, the process checks whether the audit trail system allows only one instance of each different menu screen in the audit trail at a decision step 350. If more than one instance is allowed, the process proceeds to add the new screen to the audit trail at step 332. If, however, that the system allows only one instance, the process reassigns the base_index to point to the position of the instance of base screen immediately following the existing instance of the new screen at step 352 and remove all screens added before the instance pointed by the base_index at step 354 before adding the new screen to the audit trail system at step 354. As pointed out earlier, the process may choose to remove the existing instance and all the screens added thereafter as an alternative.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method for providing an audit trail in an electronic device, the method comprising the steps of:
    saving, in a memory of the electronic device, one or more menu screens and video screens representing the audit trail;
    detecting display of a next screen comprising one of a video screen and a menu screen;
    if the next screen is a video screen and a predetermined number of video screens has already been saved in the audit trail, removing one of the predetermined number of video screens from the audit trail before adding the next screen to the audit trail; and
    if the next screen is not a video screen and an existing instance of the next screen has already been saved in the audit trail, removing the existing instance of the next screen and all screens thereafter from the audit trail before adding the next screen to the audit trail.

2. The method of claim 1, wherein the step of adding the next screen if the predetermined number of video screens has been saved in the audit trail, further comprises the step of removing any screens added before the one of the predetermined number of video screens.

3. The method of claim 1, wherein the step of adding the next screen if the predetermined number of video screens has been saved in the audit trail, further comprises the step of removing any screens between the one of the predetermined number of video screens and any immediately following video screen before adding the next screen to the audit trail.

4. The method of claim 3, wherein the one of the predetermined number of video screens is a first video screen in the audit trail.

5. The method of claim 4, further comprising the step of if the next screen is not a video screen and an instance of the next screen is in the audit trail between one of the predetermined number of video screens and a next one of the predetermined number of video screens, removing all screens added before the next one of the predetermined number of video screens.

6. The method of claim 4, wherein the first video screen is a first screen in the audit trail.

7. The method of claim 4, further comprising the step of if the next screen is not a video screen and no instance of the next screen is in the audit trail, adding the next screen to the audit trail.

8. The method of claim 4, wherein the predetermined number of video screens comprises two.

9. The method of claim 4, further comprising the step of:
    retaining screen data and temporary state information for an added next screen, the retained screen data and temporary state information restored along with a restored added next screen during backward traversing of the audit trail.

10. The method of claim 9, further comprising the step of:
    updating, in the memory, retained screen data and temporary state information for an added next screen during restoration of the added next screen during backward traversing of the audit trail.

11. The method of claim 9, further comprising the step of:
    removing a screen from the stored audit trail including notifying any retained screen data and temporary state information for the removed screen that they will be deleted in order to restore any system states that have been changed.

12. The method of claim 4, further comprising the step of:
    retaining a partial screen associated with an added next screen, the retained partial screen restored with the added next screen during backward traversing of the audit trail.

13. A digital television apparatus providing menu screens and video screens, the digital television apparatus comprising:
    a storage device for storing an audit trail comprising one or more menu screens and video screens; and
    a controller coupled to the storage device and operative to add a next screen comprising one of a video screen and a menu screen to the audit trail, wherein: (a) if the next screen is a video screen and a predetermined number of video screens has already been saved in the audit, the controller removes one of the predetermined number of video screens from the audit trail before adding the next screen to the audit trail, and (b) if the next screen is not a video screen and an existing instance of the next screen is has already been saved in the audit trail, the controller removes the existing instance of the next screen and all screens thereafter from the audit trail before adding the next screen to the audit trail.

14. The apparatus of claim 13, wherein if the predetermined number of video screens has been saved in the audit trail, the controller further removes any screens added before the one of the predetermined number of video screens.

15. The apparatus of claim 13, wherein if the predetermined number of video screens has been saved in the audit trail, the controller (30) further removes any screens between the one of the predetermined number of video screens and any immediately following video screen before adding the next screen.

16. The apparatus of claim 15, wherein the one of the predetermined number of video screens is a first video screen in the audit trail.

17. The apparatus of claim 16, wherein if the next screen is not a video screen and an instance of the next screen is in the audit trail between one of the predetermined number of video screens and a next one of the predetermined number of video screens, the controller removes all screens added before the next one of the predetermined number of video screens.

18. The apparatus of claim 16, wherein the first video screen is a first screen in the audit frail.

19. The apparatus of claim 16, wherein if the next screen is not a video screen and no instance of the next screen is in the audit trail, the controller adds the next screen to the audit trail.

20. The apparatus of claim 16, wherein the predetermined number of video screens comprises two.

21. The apparatus according to claim 16, wherein the controller is further configured to:
retain screen data and temporary state information for an added next screen in the storage, the retained screen data and temporary state information restored along with a restored added next screen during backward traversing of the audit trail.

22. The apparatus of claim 21, wherein the controller is further configured to:
update, in the storage device, retained screen data and temporary state information for an added next screen during restoration of the added next screen during backward traversing of the audit trail.

23. The apparatus of claim 21, wherein the controller is further configured to:
remove a screen from the stored audit trail including notifying any retained screen data and temporary state information for the removed screen that they will be deleted in order to restore any system states that have been changed.

24. The apparatus according to claim 16, wherein the controller is further configured to:
retain a partial screen associated with an added next screen in the storage, the retained partial screen restored with the added next screen during backward traversing of the audit trail.

25. A television apparatus, comprising:
means for saving an audit trail comprising one or more menu screens and video screens; and
means for managing the saved audit trail including the addition of a next screen comprising one of a video screen and a menu screen to the audit trail, wherein: (a) if the next screen is a video screen and a predetermined number of video screens has already been saved in the audit trail, the managing means removes one of the predetermined number of video screens from the audit trail before adding the next screen to the audit trail, and (b) if the next screen is not a video screen and an existing instance of the next screen has already been saved in the audit trail, the managing means removes the existing instance of the next screen and all screens thereafter from the audit trail before adding the next screen to the audit trail.

26. The television apparatus of claim 25, wherein if the predetermined number of video screens has been saved in the audit trail, the managing means further removes any screens added before the one of the predetermined number of video screens.

27. The television apparatus of claim 25, wherein if the predetermined number of video screens has been saved in the audit trail, the managing means further removes any screens between the one of the predetermined number of video screens and any immediately following video screen before adding the next screen.

28. The television apparatus of claim 27, wherein the one of the predetermined number of video screens is a first video screen in the audit trail.

29. The television apparatus of claim 28, wherein if the next screen is not a video screen and an instance of the next screen is in the audit trail between one of the predetermined number of video screens and a next one of the predetermined number of video screens, the managing means removes all screens added before the next one of the predetermined number of video screens.

30. The television apparatus of claim 28, wherein the first video screen is a first screen in the audit trail.

31. The television apparatus of claim 28, wherein if the next screen is not a video screen and no instance of the next screen is in the audit trail, the managing means adds the next screen to the audit trail.

32. The television apparatus according to claim 28, wherein the managing means further:
retains screen data and temporary state information for an added next screen in the means for storing, the retained screen data and temporary state information restored along with a restored added next screen during backward traversing of the audit trail.

33. The television apparatus according to claim 32, wherein the managing means further:
updates, in the saving means, retained screen data and temporary state information for an added next screen during restoration of the added next screen during backward traversing of the audit trail.

34. The television apparatus according to claim 32, wherein the managing means further:
removes a screen from the stored audit trail including notifying any retained screen data and temporary state information for the removed screen that they will be deleted in order to restore any system states that have been changed.

35. The television apparatus according to claim 32, wherein the means for managing further:
retains a partial screen associated with an added next screen in the storage, the retained partial screen restored with the added next screen during backward traversing of the audit trail.

* * * * *